(12) United States Patent
Kasahara et al.

(10) Patent No.: US 8,881,043 B2
(45) Date of Patent: Nov. 4, 2014

(54) INFORMATION PROCESSING APPARATUS, PROGRAM, AND COORDINATION PROCESSING METHOD

(75) Inventors: Shunichi Kasahara, Kanagawa (JP); Yuya Aoki, Tokyo (JP); Mitsuru Nishibe, Tokyo (JP); Takahiro Okayama, Tokyo (JP)

(73) Assignee: Sony Corporation (JP)

( * ) Notice: Subject to any disclaimer, the term of this patent is extended or adjusted under 35 U.S.C. 154(b) by 150 days.

(21) Appl. No.: 13/526,815

(22) Filed: Jun. 19, 2012

(65) Prior Publication Data

US 2012/0326997 A1     Dec. 27, 2012

(30) Foreign Application Priority Data

Jun. 23, 2011 (JP) ................................. 2011-139276

(51) Int. Cl.
| | |
|---|---|
| *G06F 3/048* | (2013.01) |
| *G06F 17/00* | (2006.01) |
| *G09G 5/00* | (2006.01) |
| *G06F 3/0488* | (2013.01) |
| *G06F 3/0484* | (2013.01) |
| *G06F 3/0481* | (2013.01) |

(52) U.S. Cl.
CPC .......... *G06F 3/04842* (2013.01); *G06F 3/0488* (2013.01); *G06F 3/0481* (2013.01)
USPC ........... 715/769; 715/835; 715/220; 345/619; 345/676; 345/672; 345/660

(58) Field of Classification Search
CPC .................... G06F 17/30061; G06F 17/30994; G06F 3/0486
USPC .......... 715/210, 220, 769, 835; 345/619, 660, 345/672, 676
See application file for complete search history.

(56) References Cited

U.S. PATENT DOCUMENTS

| | | | | |
|---|---|---|---|---|
| 6,212,577 | B1 * | 4/2001 | Stern et al. ..................... | 719/329 |
| 7,734,612 | B2 | 6/2010 | Ikeda et al. | |
| 2009/0122018 | A1 * | 5/2009 | Vymenets et al. ............ | 345/173 |
| 2009/0276701 | A1 * | 11/2009 | Nurmi .......................... | 715/702 |
| 2010/0125806 | A1 * | 5/2010 | Igeta ............................. | 715/770 |
| 2010/0262928 | A1 * | 10/2010 | Abbott .......................... | 715/769 |

FOREIGN PATENT DOCUMENTS

JP     2007-200123 A     8/2007

OTHER PUBLICATIONS

Duggirala, Purna. Clean up Incorrectly Formatted Phone Numbers using Excel. Chandoo.org. Sep. 30, 2008. <http://chandoo.org/wp/2008/09/30/clean-up-incorrectly-formatted-phone-numbers-using-excel/> Archived Jan. 25, 2009. Accessed Jan. 6, 2014.*

* cited by examiner

*Primary Examiner* — Dwayne Bost
*Assistant Examiner* — Stefan M Oehrlein
(74) *Attorney, Agent, or Firm* — Lerner, David, Littenberg, Krumholz & Mentlik, LLP

(57) ABSTRACT

Provided is an information processing apparatus including a position determination unit for determining whether or not a position of an information input area included in a display area of a first application and a position of an information output area included in a display area of a second application satisfy a predetermined first positional relationship, and a coordination processing unit for inputting, in a case it is determined that the predetermined first positional relationship is satisfied, output information of the second application that is associated with the information output area to the first application as input information associated with the information input area.

13 Claims, 12 Drawing Sheets

INFORMATION PROCESSING APPARATUS, PROGRAM, AND COORDINATION PROCESSING METHOD

CROSS-REFERENCE TO RELATED APPLICATION

The present application claims priority from Japanese Patent Application No. JP 2011-139276 filed in the Japanese Patent Office on Jun. 23, 2011, the entire content of which is incorporated herein by reference.

BACKGROUND

The present disclosure relates to an information processing apparatus, a program, and a coordination processing method.

Typically, a computer displays graphics such as texts, images, videos and the like on a display screen using a graphical user interface (GUI), and enables a user to perform various operations. Each application operating on the computer displays a graphic in a display area such as a window presented on the display screen, and performs a process according to an operation of a user via the display area.

Each application desirably provides high operability. In relation to this, various operation methods related to applications are disclosed. For example, JP 2007-200123A discloses, with respect to a search application, displaying together a related object related to a search base object specified by a user and a number-of-displays setting object used for setting the number of the related objects to be displayed, and varying the number of the related objects to be displayed by an operation on the number-of-displays setting object.

SUMMARY

However, although the operation method described in JP 2007-200123A and the like enhances the operability of each application, it does not enhance the operability in a case of using applications in combination. For example, to input output information of an application to another application, a user has to perform a traditional operation of copy and paste of the output information.

Accordingly, the present disclosure proposes an information processing apparatus, a program, and a coordination processing method which are novel and improved, and which enables applications to be used in combination by an intuitive operation.

According to the present disclosure, there is provided an information processing apparatus which includes a position determination unit for determining whether or not a position of an information input area included in a display area of a first application and a position of an information output area included in a display area of a second application satisfy a predetermined first positional relationship, and a coordination processing unit for inputting, in a case it is determined that the predetermined first positional relationship is satisfied, output information of the second application that is associated with the information output area to the first application as input information associated with the information input area.

Furthermore, according to the present disclosure, there is provided a program for causing a computer for controlling an information processing apparatus to function as a position determination unit for determining whether or not a position of an information input area included in a display area of a first application and a position of an information output area included in a display area of a second application satisfy a predetermined first positional relationship, and a coordination processing unit for inputting, in a case it is determined that the predetermined first positional relationship is satisfied, output information of the second application that is associated with the information output area to the first application as input information associated with the information input area. Here, the program may be provided using a computer-readable recording medium, or via communication means or the like.

Moreover, according to the present disclosure, there is provided a coordination processing method which includes determining whether or not a position of an information input area included in a display area of a first application and a position of an information output area included in a display area of a second application satisfy a predetermined first positional relationship, and inputting, in a case it is determined that the predetermined first positional relationship is satisfied, output information of the second application that is associated with the information output area to the first application as input information associated with the information input area.

As described above, according to the present disclosure, applications can be used in combination by an intuitive operation.

DETAILED DESCRIPTION OF THE EMBODIMENT(S)

Figure 1:
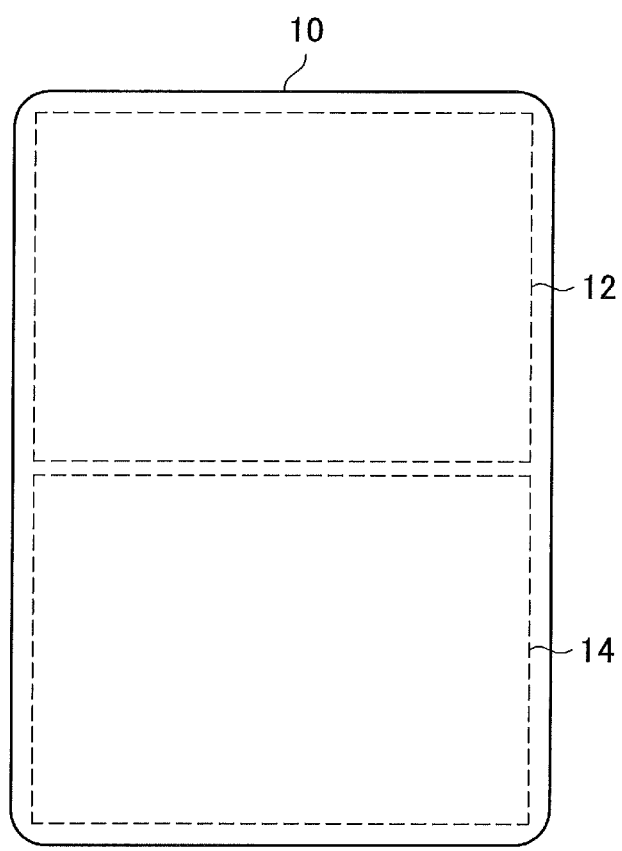
FIG. 1 is an explanatory diagram showing an example of a display area of an application according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

An information processing apparatus according to each embodiment may be a device that runs a plurality of applications on a personal computer (PC), a smartphone, a personal digital assistant or the like, for example, and that performs display. Also, the information processing apparatus may be a peripheral device connected to these devices.

Furthermore, an "application" of the present embodiments indicates software for performing a specific process. Accordingly, the application here is not limited to software that runs on an operating system (OS). For example, it may be software configuring a part of an OS.

Additionally, the explanation will be given in the following order.
1. First Embodiment
1.1. Example of Coordination Processing of Applications
1.2. Example Configuration of Information Processing Apparatus
1.3. Example of Flow of Processing
2. Second Embodiment
2.1. Example of Coordination Processing of Applications
2.2. Example Configuration of Information Processing Apparatus
2.3. Example of Flow of Processing
3. Example Hardware Configuration of Information Processing Apparatus
4. Summary 1. First Embodiment

[1.1. Example of Coordination Processing of Applications]
(Display Area of Application)

An information processing apparatus 100 according to a first embodiment assigns a part of a display area on a display screen to an application, for example. Each application can provide information to a user by displaying graphics such as texts, images, videos or the like in the display area assigned. This display area is a window, for example. A user of an application can move the display area of the application on the display screen by a touch operation on a touch screen, an operation by a mouse, and the like. Additionally, the display screen may be provided by the information processing apparatus 100, or it may be provided by a device connected to the information processing apparatus 100.

FIG. 1 is an explanatory diagram showing an example of the display area of an application according to the first embodiment. Referring to FIG. 1, a display area 10 of an application includes an information input area 12 and an information output area 14. The information input area 12 is associated with input information for the application. The input information here is not specific information that is to be input, but is an argument of the application. A graphic which indicates that this area is an area for receiving input to the application is displayed in the information input area 12. On the other hand, the information output area 14 is associated with output information of the application. A graphic which is a metaphor of the output information of the application is displayed in the information output area 14.

Figure 2:
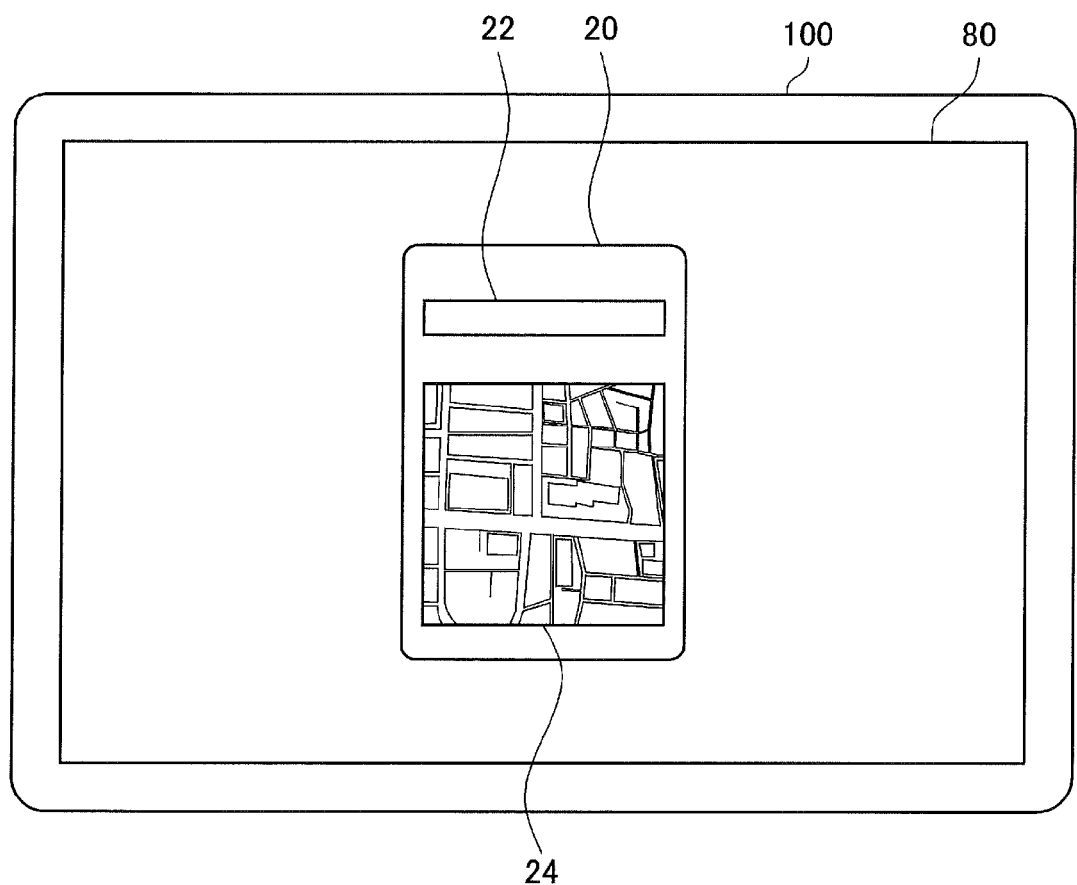
FIG. 2 is an explanatory diagram showing an example of a display area of a specific application according to the embodiment.

FIG. 2 is an explanatory diagram showing an example of the display area of a specific application according to the first embodiment. The application shown in FIG. 2 is a map display application. When an address is input, this map display application displays a map including the addressed location. Each location on the displayed map is associated with information about the location (address information, latitude information, longitude information, building name information, and the like). Referring to FIG. 2, a display area 20 of the application displayed on a display screen 80 includes an information input area 22 and an information output area 24. A text box is displayed in the information input area 22. The information input area 22 is associated with address information which is input information for the application. On the other hand, a map that is in accordance with the address information, which is the input information, is displayed in the information output area 24. The information output area 24 is associated with information about each location (address information, latitude information, longitude information, building name information, and the like) on the map, which is output information from the application.

The information output area 14 shown in FIG. 1 may be associated with one or more output information candidates. For example, the information output area 24 shown in FIG. 2 is associated with the address information, the latitude information, the longitude information, the building name information and the like of each location. In this case, each piece of the information or a combination of pieces of the information is taken as the output information.

Furthermore, the information output area 14 shown in FIG. 1 may include a plurality of individual output areas. Each individual output area may be associated with one or more output information candidates. For example, strictly speaking, the information output area 24 shown in FIG. 2 is formed from individual output areas divided for each location. Each individual output area is associated with an output information candidate, such as the address information, the latitude information, the longitude information, the building name information, and the like associated with each location.

Additionally, the size and position of each of the information input area 12 and the information output area 14 are not limited. Also, the display area 10 of the application includes both the information input area 12 and the information output area 14 in the example shown in FIG. 1, but the display area 10 of the application may include only one of the information input area 12 and the information output area 14, for example.

(Method of Coordination Processing)

The information processing apparatus 100 according to the present embodiment determines whether the position of an information input area included in the display area of a first application and the position of an information output area included in the display area of a second application satisfy a predetermined first positional relationship (hereinafter, referred to as "coordination execution positional relationship"). Then, in the case the coordination execution positional relationship is satisfied, the information processing apparatus 100 inputs output information of the second application associated with the information output area to the first application as input information that is associated with the information input area. For example, the coordination execution positional relationship is a positional relationship where the information input area and the information output area are at least partially overlapped. In this case, a user can input output information of the second application to the first application by causing the information input area of the first application and the information output area of the second application to overlap by a touch operation, an operation by a mouse, or the like. In this manner, a user is enabled to use applications in combination by an intuitive operation.

Example 1

Figure 3:
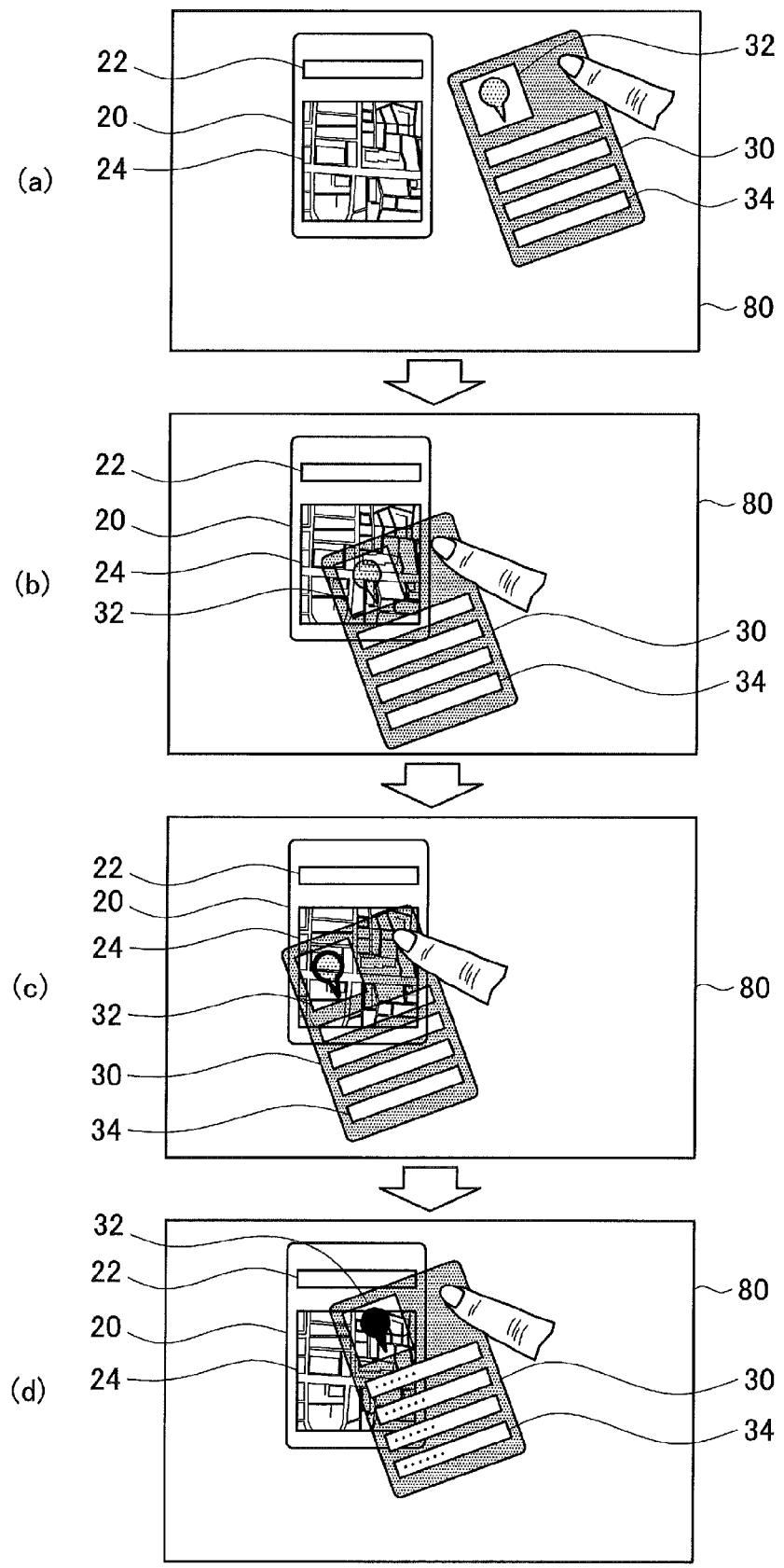
FIG. 3 is an explanatory diagram showing an example of coordination processing of applications according to the embodiment.

FIG. 3 is an explanatory diagram showing an example of coordination processing of applications according to the first embodiment. Referring to FIG. 3, the display area 20 of the map display application described with reference to FIG. 2 and a display area 30 of a location message application (hereinafter, referred to as "LM application") are displayed on the display screen 80.

When an address is input, the LM application displays a message present in the periphery of the addressed location. This message is a message posted by an on-line service such as Twitter, that is, a so-called Tweet, for example. Referring to FIG. 3, the display area 30 of the application includes an information input area 32 and an information output area 34. A pin for pointing to a location on a map is displayed in the information input area 32. The information input area 32 is associated with address information which is input information for the application. On the other hand, a message that is in accordance with the address information, which is the input information, is displayed in the information output area 34. Here, a part of the message (only the first twenty characters) is displayed, for example. Furthermore, the information output area 34 is associated with information about each message (whole texts of the message, writer, and the like).

Referring to FIG. 3, first, in (a), the display area 20 of the map display application and the display area 30 of the LM application are brought near each other by an operation of a user. Here, the operation of the user is shown as a touch operation on a touch screen. When the information input area 32 is brought near the information output area 24 in this manner, it is determined whether output information that is associated with the information output area 24 can be input as input information associated with the information input area 32. Here, coordination information of the map display application and the LM application set in advance is referred to, for example, and it is determined that the output information (address information) associated with the information output area 24 can be input as the input information (address information) associated with the information input area 32.

Next, the information input area 32 and the information output area 24 are overlapped in (b). Then, as in (c), that input information can be received is shown in the information input area 32. Then, as in (d), the address information of a location pointed, in the map in the information output area 24, by a pin displayed in the information input area 32 is input as the input information for the LM application. As a result, a message in the periphery of the addressed location indicated by the address information is displayed in the information output area 34 of the LM application.

Example 2

Figure 4:
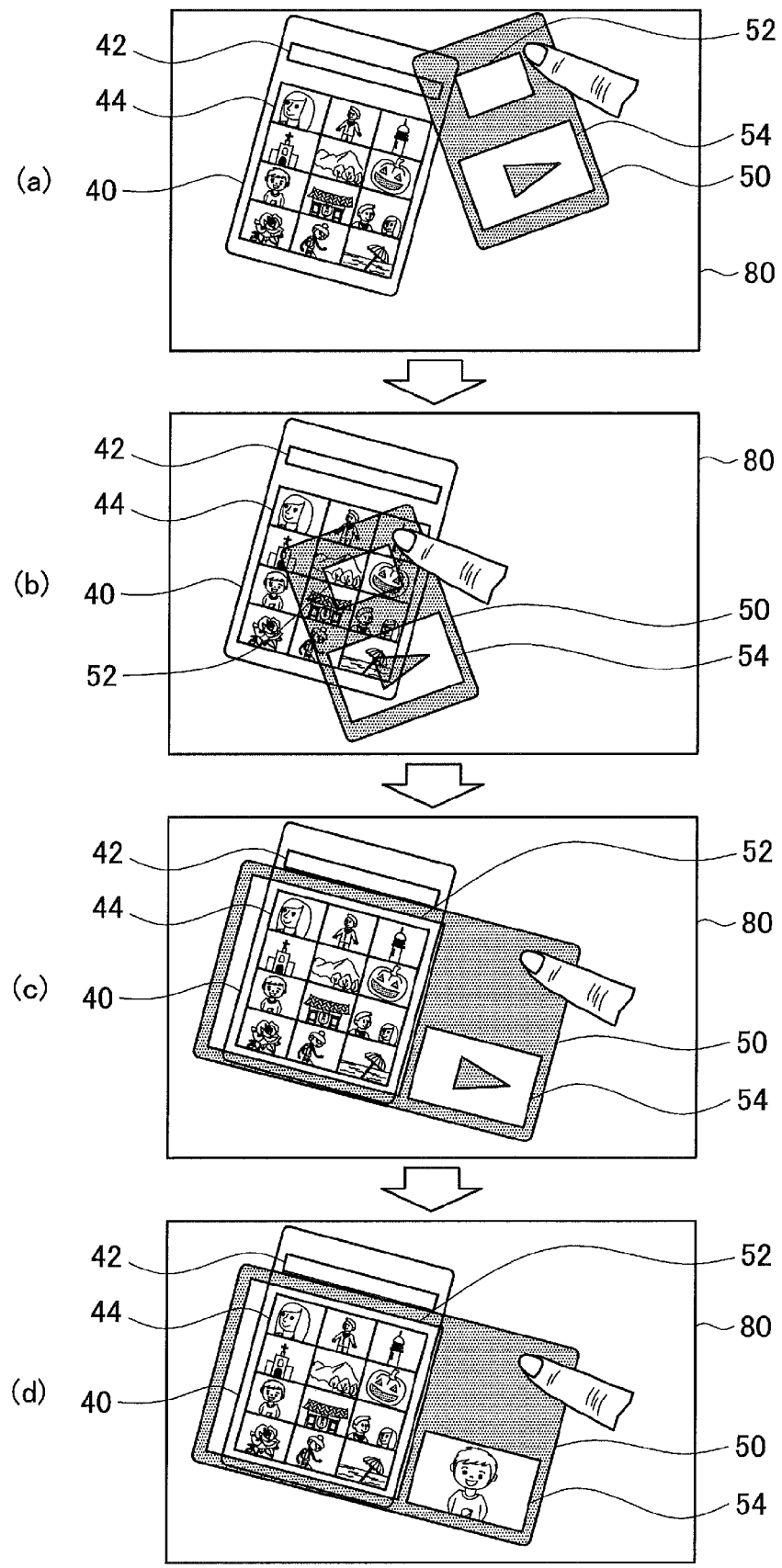
FIG. 4 is an explanatory diagram showing an example of coordination processing of applications according to the embodiment.

FIG. 4 is an explanatory diagram showing an example of coordination processing of applications according to the first embodiment. Referring to FIG. 4, a display area 40 of a photograph display application and a display area 50 of a semi-automatic video creation application are displayed on a display screen 80.

When text is input, the photograph display application displays a thumbnail of a photograph related to the text. For example, when a name of a person is input, a thumbnail of a photograph of the person is displayed. Referring to FIG. 4, the display area 40 of this application includes an information input area 42 and an information output area 44. A text box is displayed in the information input area 42. The information input area 42 is associated with text which is input information for the application. On the other hand, a thumbnail of a photograph that is in accordance with the text, which is the input information, is displayed in the information output area 44. The information output area 44 is associated with original photograph data, which is output information of the application, of each thumbnail.

When an image such as a photograph is input, the semi-automatic video creation application automatically creates a video based on the image, and displays the video. This video is a slide show of images input, for example. Referring to FIG. 4, the display area 50 of the application includes an information input area 52 and an area 54. A frame of an image indicating a part to input an image is displayed in the information input area 42. The information input area 52 is associated with an image which is input information for the application. On the other hand, a video which has been created is displayed in the area 54. For example, this area 54 is used only to display a video, and is not associated with output information of the application.

Referring to FIG. 4, first, in (a), the display area 40 of the photograph display application and the display area 50 of the semi-automatic video creation application are brought near each other by an operation of a user. Here, the operation of the user is shown as a touch operation on a touch screen. When the information input area 52 is brought near the information output area 44 in this manner, it is determined whether output information that is associated with the information output area 44 can be input as input information associated with the information input area 52. Here, coordination information of the photograph display application and the video creation application set in advance is referred to, for example, and it is determined that the output information (original photograph data) that is associated with the information output area 44 can be input as the input information (image) associated with the information input area 52.

Next, the information input area 52 and the information output area 44 are overlapped in (b). Then, as in (c), the information input area 52 is modified according to the shape, size and tilt of the information output area 44, for example. Then, as in (d), a thumbnail to be input to the semi-automatic video creation application, among thumbnails shown in the information output area 44, is selected by a touch operation, and the original image of the thumbnail selected is input to the semi-automatic video creation application. As a result, a video created from the original photograph data is displayed in the area 54 of the semi-automatic video creation application.

[1.2. Example Configuration of Information Processing Apparatus]

Figure 5:
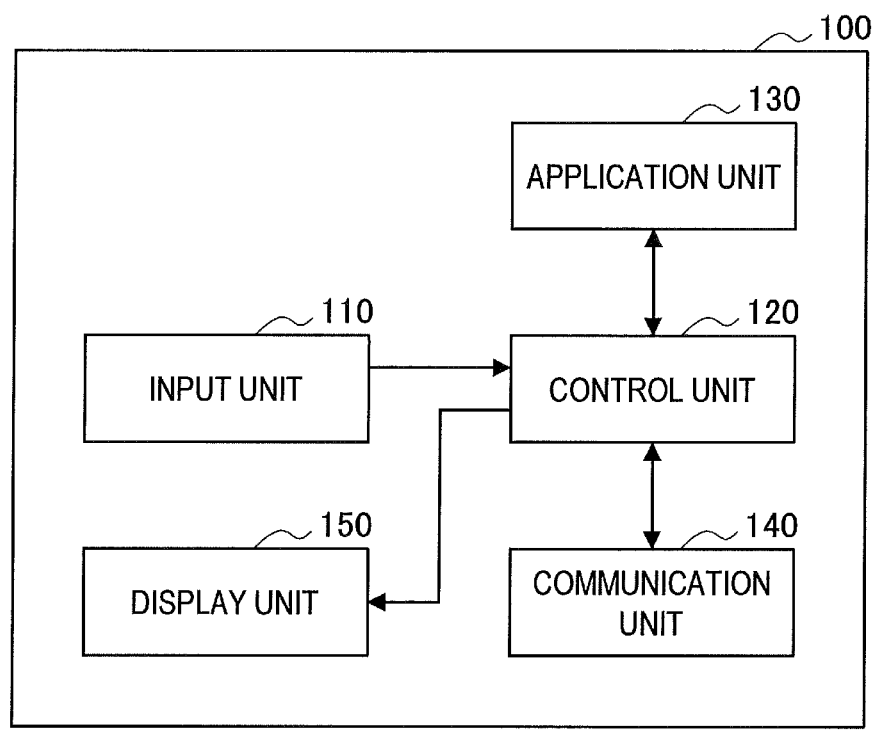
FIG. 5 is a block diagram showing an example of a functional configuration of an information processing apparatus according to the embodiment.
Figure 6:
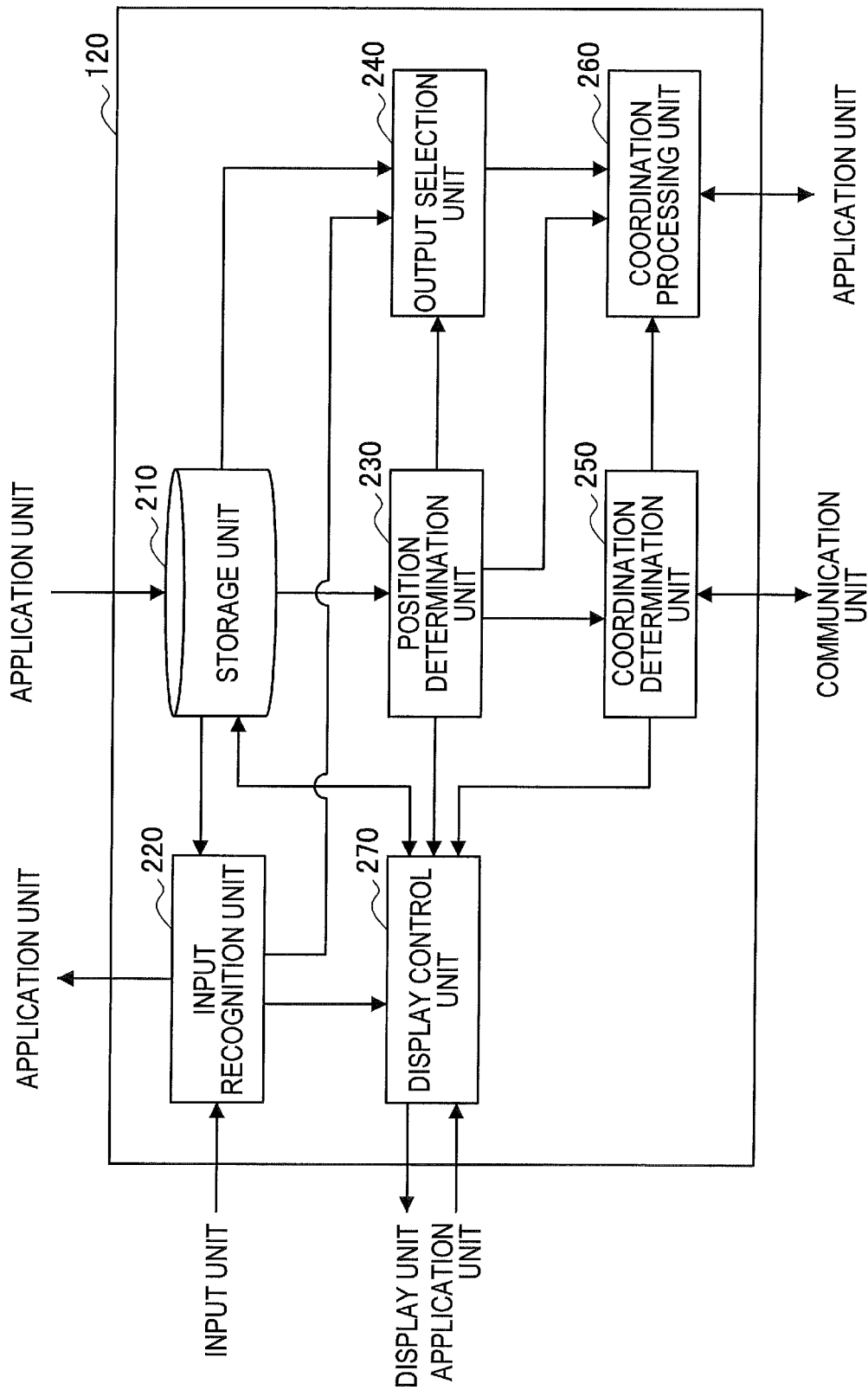
FIG. 6 is a block diagram showing an example of a functional configuration of a control unit according to the embodiment.

Next, a concrete configuration of the information processing apparatus 100 according to the first embodiment will be described using FIGS. 5 and 6. FIG. 5 is a block diagram showing an example of a functional configuration of the information processing apparatus 100 according to the first embodiment. Referring to FIG. 5, the information processing apparatus 100 includes an input unit 110, a control unit 120, an application unit 130, a communication unit 140, and a display unit 150.

(Input Unit 110)

The input unit 110 acquires operation information from an input operation performed by a user. This input operation may be any of a touch operation on a touch screen, an operation by a mouse, and an operation using a keyboard, for example. The input unit 110 transfers the operation information acquired to the control unit 120.

(Control Unit 120)

The control unit 120 controls the entire information processing apparatus 100. A detailed functional configuration of the control unit 120 will be described later. Here, an outline of the control unit 120 will be given.

Firstly, as described in [1.1. Example of Coordination Processing of Applications], the control unit 120 performs a series of processes for inputting output information from an application as input information for another application. During the processing, the control unit 120 acquires output information of an application from the application unit 130, and provides the output information to the application unit 130 as input information for another application. Furthermore, during the processing, the control unit 120 also acquires information about the display area of each application from the application unit 130. Specific details of the information will be given later. Furthermore, during the processing, the control unit 120 acquires via the communication unit 140 information necessary for coordination of applications.

Secondly, the control unit 120 recognizes, from the operation information acquired by the input unit 110, information necessary for a process that is to be performed according to the input operation. Here, in the case an input operation for individual process by each application is performed, the control unit 120 recognizes information necessary for the process by each application, and transmits the information to the application unit 130.

Thirdly, the control unit 120 controls details of an output display image that is displayed on a display screen. Here, the control unit 120 acquires from the application unit 130 a graphic to be displayed in the display area of each application. Moreover, the control unit 120 controls movement and modification of the display area of an application.

(Application Unit 130)

The application unit 130 performs a process that is in accordance with each application. The applications are the map display application, the LM application, the photograph display application, and the semi-automatic video creation application as shown in FIGS. 3 and 4, for example. Furthermore, the application unit 130 receives information necessary for the process by each application recognized by the control unit 120 from the operation information, and performs a process corresponding to the information. Moreover, during coordination processing of applications by the control unit 120, the application unit 130 provides output information of an application to the control unit 120, and receives the output information as input information for another application. Furthermore, during the processing, the application unit 130 also provides to the control unit 120 information about the display area of each application, and a graphic to be displayed in the display area of each application. Additionally, the application unit 130 does not have to be provided in the information processing apparatus 100, and a similar function may be provided instead in a separate device capable of communicating with the information processing apparatus 100. In this case, the information processing apparatus 100 may exchange necessary information with the separate device capable of communication, via the communication unit 140 to be described later, for example. Moreover, it is needless to say that the application unit 130 and the similar function of the separate device capable of communication may be used together.

(Communication Unit 140)

The communication unit 140 performs communication over a network in response to a request from a coordination determination unit 250 to be described later, which is included in the control unit 120.

(Display Unit 150)

The display unit 150 displays an output display image from the information processing apparatus 100 on a display screen, under the control of a display control unit 270 to be described later, which is included in the control unit 120. The output display image may include a graphic displayed in the display area of an application. Also, the output display image may include a graphic of an operating system (not illustrated) of the information processing apparatus 100. Additionally, as described above, the display screen may be provided by the information processing apparatus 100, or it may be provided by a device connected to the information processing apparatus 100.

A more concrete configuration of the control unit 120 will be described. FIG. 6 is a block diagram showing an example of a functional configuration of the control unit 120. Referring to FIG. 6, the control unit 120 includes a storage unit 210, an input recognition unit 220, a position determination unit 230, an output selection unit 240, a coordination determination unit 250, a coordination processing unit 260, and a display control unit 270.

(Storage Unit 210)

The storage unit 210 stores information about the display area of each application (hereinafter, referred to as "display area-related information"). The display area-related information includes information of positions of a display area, an information input area, and an information output area. Furthermore, in the case the information output area includes a plurality of individual output areas, the display area-related information also includes information of the position of each individual output area. The position here means a range on a screen where each area exists, for example. In this case, the information of the position may include the coordinates of a centre point of each area, and the size, shape and tilt of the area.

(Input Recognition Unit 220)

The input recognition unit 220 recognizes from operation information acquired by an input operation information necessary for a process to be performed according to the input operation. To recognize the information, the input recognition unit 220 acquires the display area-related information of each application from the storage unit 210.

For example, in the case an input operation of moving the display area of an application is performed, the input recognition unit 220 recognizes area movement information indicating a movement direction and a movement distance. Also, for example, in the case an input operation of modifying the display area of an application is performed, the input recognition unit 220 recognizes area modification information indicating the details of the modification. Then, the input recognition unit 220 provides the area movement information or the area modification information to the display control unit 270. Additionally, the modification to the display area here may be a change in the shape of the display area, a change in the size of the display area, or a change in the tilt of the display area.

Furthermore, for example, in the case an input operation for an individual process by each application is performed, the input recognition unit 220 recognizes information necessary for the process by each application. For example, in the case a touch operation of pinching out (typically, an operation for enlarging a map) on the information output area 24 of the map display application shown in FIG. 2 is performed, the input recognition unit 220 recognizes information indicating the amount of pinch-out on the information output area 24. Then, the input recognition unit 220 provides the information to the application unit 130.

Furthermore, for example, in the case an input operation of selecting an individual output area is performed, the input recognition unit 220 recognizes area specifying information specifying at least one of individual output areas. For example, as in (d) of FIG. 4, in the case an input operation of selecting an individual output area (an area where each thumbnail is displayed) in the information output area 44 is performed, area specifying information specifying the individual output area is recognized. Then, the input recognition unit 220 provides the area specifying information to the output selection unit 240.

(Position Determination Unit 230)

The position determination unit 230 determines whether the position of an information input area included in the display area of a first application (hereinafter, "input-side application") and the position of an information output area included in the display area of a second application (hereinafter, "output-side application") satisfy a coordination execution positional relationship. The coordination execution positional relationship is a positional relationship where an information input area and an information output area are partially overlapped, for example. For example, in the case the information input area 32 of the LM application overlaps the information output area 24 of the map display application as in (b) of FIG. 3, the position determination unit 230 determines that the coordination execution positional relationship is satisfied. In other cases, the position determination unit 230 may determine that the coordination execution positional relationship is not satisfied. Additionally, the display area-related information stored in the storage unit 210 includes information of the positions of the information input area and the information output area, and thus, the position determination unit 230 can determine whether the coordination execution positional relationship is satisfied by acquiring and using the display area-related information. The position determination unit 230 provides the result of the determination to the output selection unit 240, the coordination processing unit 260, and the display control unit 270.

Also, the position determination unit 230 further determines whether the position of the information input area and the position of the information output area satisfy a predetermined second positional relationship (hereinafter, "coordination availability determination positional relationship"). The coordination availability determination positional relationship is a positional relationship where the distance between the information input area and the information output area is a predetermined distance or less, for example. The distance here may be a distance between a point nearest to the information output area, among points included in the information input area, and a point nearest to the information input area, among points included in the information output area. For example, in the case the information input area 32 of the LM application neared the information output area 24 of the map display application as in (a) of FIG. 3, the position determination unit 230 determines, if the shortest distance between the areas is the predetermined distance or less, that the coordination availability determination positional relationship is satisfied. In other cases, the position determination unit 230 may determine that the coordination availability determination positional relationship is not satisfied. The position determination unit 230 provides the result of the determination to the coordination determination unit 250 and the display control unit 270.

(Output Selection Unit 240)

In the case the information output area includes a plurality of individual output areas, the output selection unit 240 selects at least one of the individual output areas. The output selection unit 240 selects the individual output area after receiving from the position determination unit 230 a determination result indicating that the coordination execution positional relationship is satisfied, for example.

For example, the output selection unit 240 selects at least one of the individual output areas based on the position of the information input area and the position of each of the plurality of individual output areas. More specifically, the output selection unit 240 selects an individual output area which is at a position that coincides with or that is near the position of the information input area, for example. The range of proximity may be set in advance. For example, as in (d) of FIG. 3, the output selection unit 240 selects, based on the position of a pin in the information input area 32 of the LM application and the position of each of a plurality of individual output areas (locations) included in the information output area 24 of the map display application, an individual output area (location) pointed to by the pin. With such selection enabled, a user is allowed to easily and intuitively perform selection of an individual output area included in an information output area as an extension of an operation of moving an information input area.

Furthermore, for example, the output selection unit 240 is provided by the input recognition unit 220 with the area specifying information, and selects the individual output area specified by this area specifying information. For example, in the case a touch operation of selecting an individual output area (an area where each thumbnail is displayed) in the information output area 44 is performed, as in (d) of FIG. 4, the output selection unit 240 receives from the input recognition unit 220 the area specifying information specifying the individual output area. Then, the output selection unit 240 selects the individual output area selected. Additionally, the number of the individual output areas to be selected is not limited to one, and it may be more than one. In this manner, by introducing a separate operation that is suitable for the information output area for selection of the individual output area, the individual output area may be selected with ease.

By enabling selection of an individual output area in the above manner, the application can present, to a user, various options regarding output information. In other words, the user of the application can freely select, from a plurality of pieces of output information, output information that the user wants to input.

(Coordination Determination Unit 250)

The coordination determination unit 250 determines whether output information that is associated with the information output area can be input as input information associated with the information input area. More specifically, in the case it is determined that the coordination availability determination position relationship is satisfied, for example, the coordination determination unit 250 determines whether the output information can be input as the input information.

For example, coordination information indicating a pair of an information input area and an information output area that can coordinate is defined in advance. This coordination information is stored in a server existing on a network, for example. For example, coordination information indicating the pair of the information output area 24 of the map display application and the information input area 32 of the LM application shown in FIG. 3 is defined in advance and is stored. Likewise, coordination information indicating the pair of the information output area 44 of the photograph display application and the information input area 52 of the semi-automatic video creation application shown in FIG. 4 is defined in advance and is stored. The coordination determination unit 250 externally acquires, via the communication unit 140, coordination information indicating the pair of an information input area and an information output area that are the targets, for example. In the case the coordination information is acquired, the coordination determination unit 250 determines that the output information that is associated with the information output area can be input as the input information associated with the information input area. On the other hand, in the case the coordination information is not acquired, the coordination determination unit 250 determines that the output information is not to be input as the input information. Then, the coordination determination unit 250 provides the result of the determination to the coordination processing unit 260 and the display control unit 270.

Furthermore, for example, an application interface (API) for inputting the output information as the input information is defined together with the coordination information and is stored. The coordination determination unit 250 also externally acquires the API via the communication unit 140. Then, the coordination determination unit 250 provides the API to the coordination processing unit 260.

As described above, by determining in advance, before the coordination execution positional relationship is satisfied, whether input is enabled or not, the coordination process can be started without delay after the coordination execution positional relationship is satisfied, and also, as will be described later, an indicator regarding the availability of input can be presented to a user without delay.

(Coordination Processing Unit 260)

In the case it is determined that the coordination execution positional relationship is satisfied, the coordination processing unit 260 inputs to the input-side application the output information of the output-side application that is associated with the information output area as the input information associated with the information input area. Applications can thereby be combined and used simply by performing an intuitive operation of moving the position of the information output area or the information input area.

The coordination processing unit 260 takes, as the output information, at least one of one or more output information candidates associated with the information output area, for example.

For example, the coordination processing unit 260 takes an output information candidate corresponding to the input information as the output information. The output information candidate corresponding to the input information here is an output information candidate, among output information candidates, attributed as being able to be input as the input information. Specifically, output information candidates such as address information, altitude information, longitude information, building name information and the like of each location are associated with the information output area 24 of the map display application shown in FIG. 3. On the other hand, the input information associated with the information input area 32 of the LM application is address information. Accordingly, the coordination processing unit 260 takes the address information among the output information candidates associated with the information output area 24 as the output information. Then, the coordination processing unit 260 inputs, as the input information associated with the information input area 32, the address information which was taken as the output information. In this manner, the output-side application can provide, in the same information output area, the output information that is suitable for the information input area of the input-side application.

Furthermore, for example, in the case an individual output area included in the information output area is selected, the coordination processing unit 260 takes, as the output information, an output information candidate associated with the individual output area. Here, the individual output area is selected by the output selection unit 240 as described above. As a concrete example, the information output area 24 of the map display application shown in FIG. 3 includes an individual output area in which each location on the map is displayed. Further, an individual output area in which a certain location is displayed is selected. In this case, the coordination processing unit 260 takes, as the output information, an output information candidate that is associated with the individual output area in which the location is displayed, that is, information about the location. Additionally, the output information is input here as the input information for the information input area 32 of the LM application, and therefore, is specifically the address information of the location. Also, as another concrete example, the information output area 44 of the photograph display application shown in FIG. 4 includes an individual output area in which each thumbnail is displayed. Also, an individual output area in which a certain thumbnail is displayed is selected. In this case, the coordination processing unit 260 takes, as the output information, an output information candidate that is associated with the individual output area in which the thumbnail is displayed, that is, the original photograph data of the thumbnail. In this manner, by enabling selection from a plurality of individual output areas, a user is enabled to select a desired output information candidate from a plurality of output information candidates.

(Display Control Unit 270)

The display control unit 270 controls the details of an output display image that is to be displayed on the display screen. For example, the display control unit 270 causes to be displayed on the display screen a graphic on the display area of an application and a graphic of an operating system. The display control unit 270 can, based on display area-related information of an application stored in the storage unit 210 and a graphic provided by the application unit, display the graphic on the display area of the application. Also, in the case it is determined by the coordination determination unit 250 that output information can be input as input information, the display control unit 270 may display on the display screen an indicator indicating that input from the output-side application to the input-side application is allowed. Also, in the case it is determined by the coordination determination unit 250 that output information is not to be input as input information, the display control unit 270 may display on the display screen an indicator indicating that the input is not allowed. For example, as in (c) of FIG. 8, the display control unit 270 displays on the display screen an indicator 70 indicating that input is not allowed. Display of such an indicator enables notification to a user regarding whether coordination of applications is possible or not.

Furthermore, the display control unit 270 controls movement and modification of the display area of an application. For example, when the input recognition unit 220 recognizes, from an input operation of moving the display area of an application, area movement information indicating a movement direction and a movement distance, the display control unit 270 updates the display area-related information in the storage unit 210 based on the area movement information. Also, in the case it is determined by the position determination unit 230 that the coordination execution positional relationship is satisfied, for example, the display control unit 270 may modify the information input area. Here, the display control unit 270 may modify the information input area according to at least one of the shape, size, and tilt of the information output area. Furthermore, the display control unit 270 may modify the information input area by changing at least one of the shape, size, and tilt of the information input area. Specifically, as shown in (c) of FIG. 4, the display control unit 270 modifies the information input area 52 of the semi-automatic video creation application according to the shape, size, and tilt of the information output area 44 of the photograph display application. The information input area 52 here has its shape, size, and tilt changed. Additionally, the display control unit 270 may determine, according to the type of the application, whether to modify the information input area or not. By modifying the shape of the information input area in this manner, that coordination of applications is allowed can be clearly indicated to a user, and also, it becomes possible to prompt the user to select an individual output area.

[1.3. Example of Flow of Processing]

Figure 7:
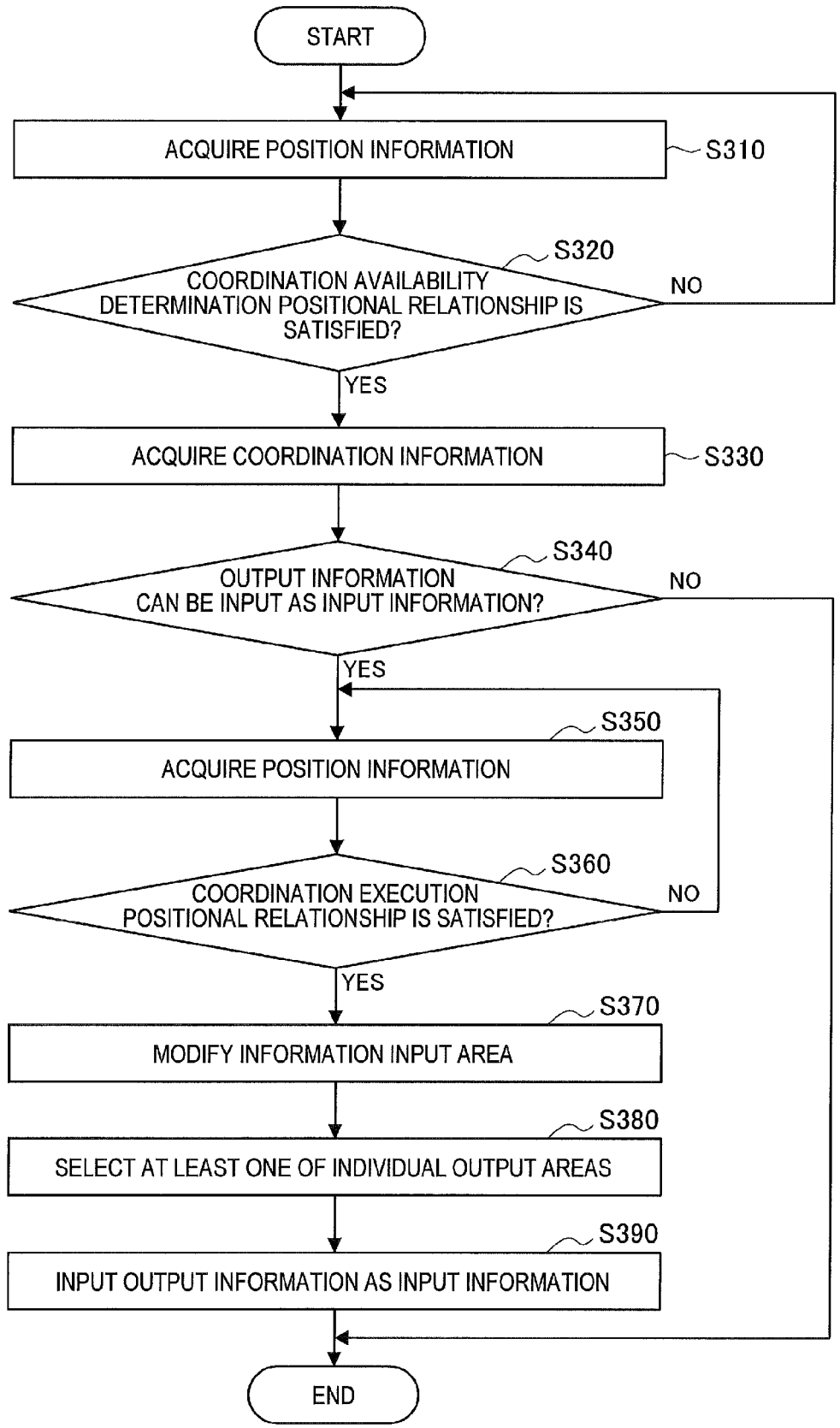
FIG. 7 is a flow chart showing an example of an approximate flow of coordination processing according to the embodiment.

In the following, the coordination processing according to the first embodiment will be described using FIG. 7. FIG. 7 is a flow chart showing an example of an approximate flow of the coordination processing according to the first embodiment. For example, this coordination processing is performed for each pair of the information input area and the information output area.

Referring to FIG. 7, first, in step S310, the position determination unit 230 acquires information, stored in the storage unit 210, about the positions of the information input area of the input-side application and the information output area of the output-side application.

Next, in step S320, the position determination unit 230 determines whether the position of the information input area and the position of the information output area satisfy the coordination availability determination positional relationship. If the coordination availability determination positional relationship is satisfied here, the process proceeds to step S330. On the other hand, if the coordination availability determination positional relationship is not satisfied, the process returns to step S310.

Next, in step S330, the coordination determination unit 250 acquires coordination information indicating the pair of the information input area and the information output area. Moreover, the coordination determination unit 250 also acquires an API used for inputting output information that is associated with the information output area as input information associated with the information input area.

Then, in step S340, the coordination determination unit 250 determines whether the output information that is associated with the information output area can be input as the input information associated with the information input area. For example, the coordination determination unit 250 can determine whether the output information can be input as the input information, by checking whether the coordination information has been acquired. Here, if the input is allowed, the process proceeds to step S350. On the other hand, if the input is not allowed, the process is ended.

Next, in step S350, the position determination unit 230 acquires the information about the positions of the information input area and the information output area.

Then, in step S360, the position determination unit 230 further determines whether the position of the information input area and the position of the information output area satisfy the coordination execution positional relationship. If the coordination execution positional relationship is satisfied here, the process proceeds to step S370. On the other hand, if the coordination execution positional relationship is not satisfied, the process returns to step S350.

Next, in S370, the display control unit 270 modifies the information input area. Additionally, depending on the type of the application, the display control unit 270 does not modify the information input area.

Next, in the case the information output area includes a plurality of individual output areas, the output selection unit 240 selects in step S380 at least one of the individual output areas. Additionally, in the case the information output area does not include individual output areas, selection of an individual output area is not performed.

Then, in step S390, the coordination processing unit 260 inputs, to the input-side application, as the input information associated with the information input area, the output information that is associated with the information output area. Here, if one or more output information candidates are associated with the information output area, at least one of the output information candidates is selected as the output information. As a matter of course, if an individual output area is selected, an output information candidate that is associated with this individual output area is taken as the output information. The process is ended after this step S390.

2. Second Embodiment

An information processing apparatus according to the second embodiment of the present disclosure is an information processing apparatus further including, in addition to the functions of the information processing apparatus according to the first embodiment of the present disclosure, a function of extracting information necessary for newly defining coordination processing of applications.

[2.1. Example of Coordination Processing of Applications]

The contents of [1.1. Example of Coordination Processing of Applications] described with respect to the first embodiment also apply to the second embodiment. Output information that is associated with the information output area of an output-side application is sometimes determined not to be input as input information associated with an input-side application. Such determination is achieved not only when the output information is information of a type that is not allowed to be input as the input information, but also when the output information can be input as the input information but the coordination information regarding the two is not yet defined. Thus, to define the coordination information in the latter case, the information processing apparatus according to the second embodiment compares an input information sample that is actually input as the input information after the determination and one or more output information candidates which may be the output information, and thereby extracts an attribute of an output information candidate which may be input as the input information.

Example 3

Figure 8:
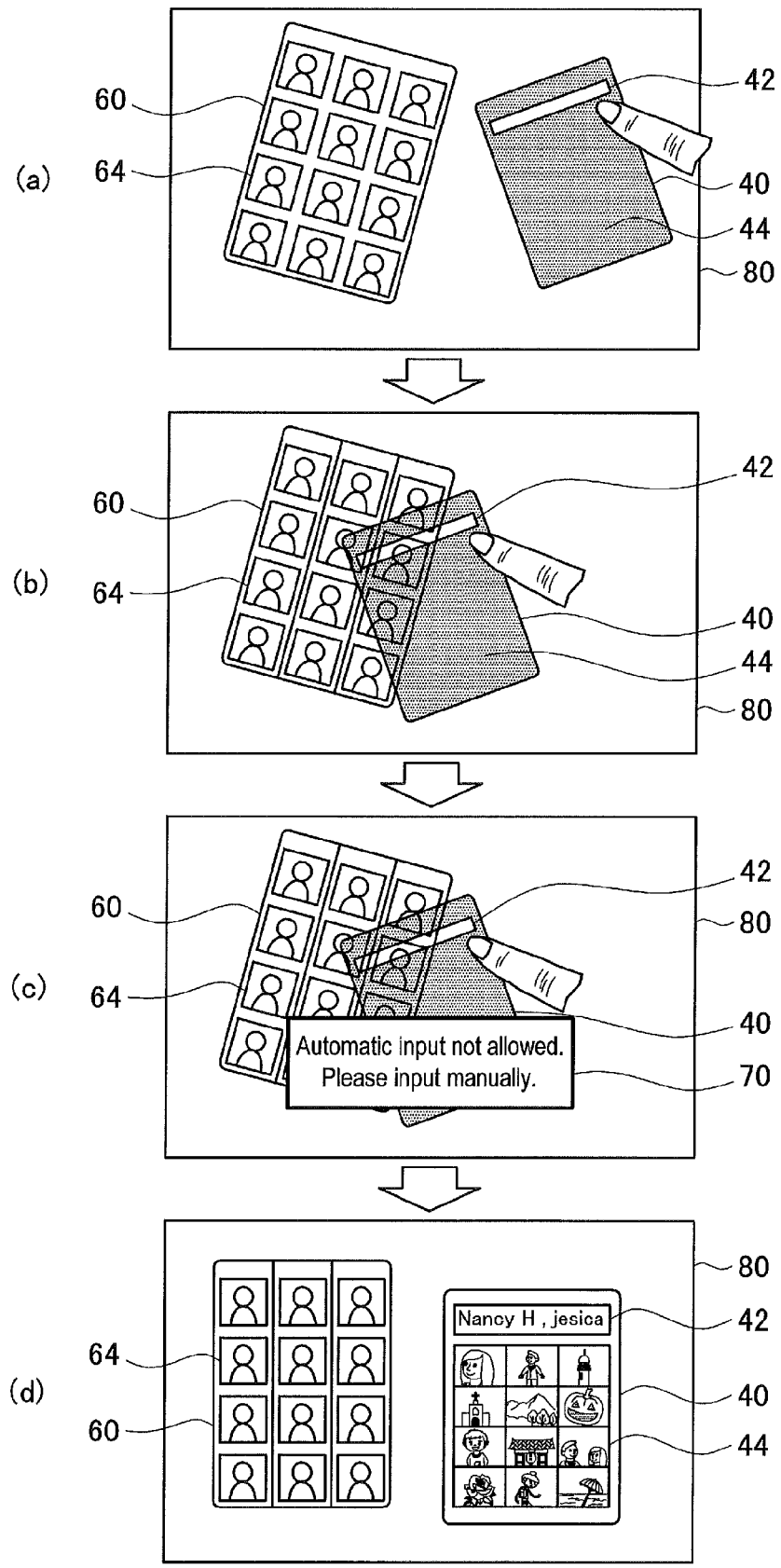
FIG. 8 is an explanatory diagram showing an example of coordination processing of applications according to a second embodiment of the present disclosure.

FIG. 8 is an explanatory diagram showing an example of coordination processing of applications according to the second embodiment. Referring to FIG. 8, a display area 60 of a friend list application and the display area 40 of the photograph display application which was described with reference to FIG. 4 are displayed on a display screen 80.

The friend list application displays a list of photographs of registered friends' faces. Referring to FIG. 8, the display area 60 of this application includes an information output area 64. The list of photographs of registered friends' faces is displayed in the information output area 64. Also, this information output area 64 is associated with profile information of each friend (ID, name, age, nationality, occupation, and the like). This profile information, which is output information, is stored in the form as below, for example.

TABLE 1

| ID | Name | Age | Nationality | Occupation | ... |
|----|------|-----|-------------|------------|-----|
| 1 | Nancy H | 20 | USA | Student | ... |
| 2 | Hanako | 25 | Japan | Office Worker | ... |
| 3 | Ken | 22 | Japan | Student | ... |
| 4 | jesica | 50 | USA | Professor | ... |

Referring to FIG. 8, first, in (a), the display area 60 of the friend list application and the display area 40 of the photograph display application are brought near each other by an operation of a user. Here, the operation of the user is shown as a touch operation on a touch screen. When the information input area 42 is brought near the information output area 64 in this manner, it is determined whether output information that is associated with the information output area 64 can be input as input information associated with the information input area 42. Here, for example, coordination information of the friend list application and the photograph display application set in advance is not found, and thus it is determined that the output information (ID, name, age, nationality, occupation, and the like) that is associated with the information output area 64 is not to be input as input information (texts) associated with the information input area 42.

Next, in (b), the information input area 42 and the information output area 64 are overlapped. Then, an indicator, "Automatic input not allowed. Please input manually.", is displayed as in (c). Thus, as in (d), the user inputs "Nancy H, jesica" in the text box in the information input area 42.

Then, the information processing apparatus compares "Nancy H" and "jesica" with the output information (name, age, nationality, occupation, and the like) associated with the information output area 64. Referring to Table 1, it can be seen that "Nancy H" and "jesica" has the attribute "Name" among the output information candidates. Therefore, the information processing apparatus extracts "Name" as the attribute of the output information candidate which may be input as the input information.

The attribute extracted in the above manner, the information input area of the input-side application, and the information output area of the output-side application are associated with each other and accumulated as learning information. This learning information is transmitted from the information processing apparatus to a server existing on a network, for example, and is accumulated on the server. Then, it is learnt based on the learning information accumulated that that which has the attribute "Name" among the output information candidates associated with the information input area 64 of the friend list application is to be input to the information input area 42 of the photograph display application, for example. Then, coordination information indicating the pair of the information output area 64 of the friend list application and the information input area 42 of the photograph display application is generated. Also, an API is generated that inputs, as input information associated with the information input area 42, that which has the attribute "Name" among the output information candidates associated with the information output area 64.

Figure 9:
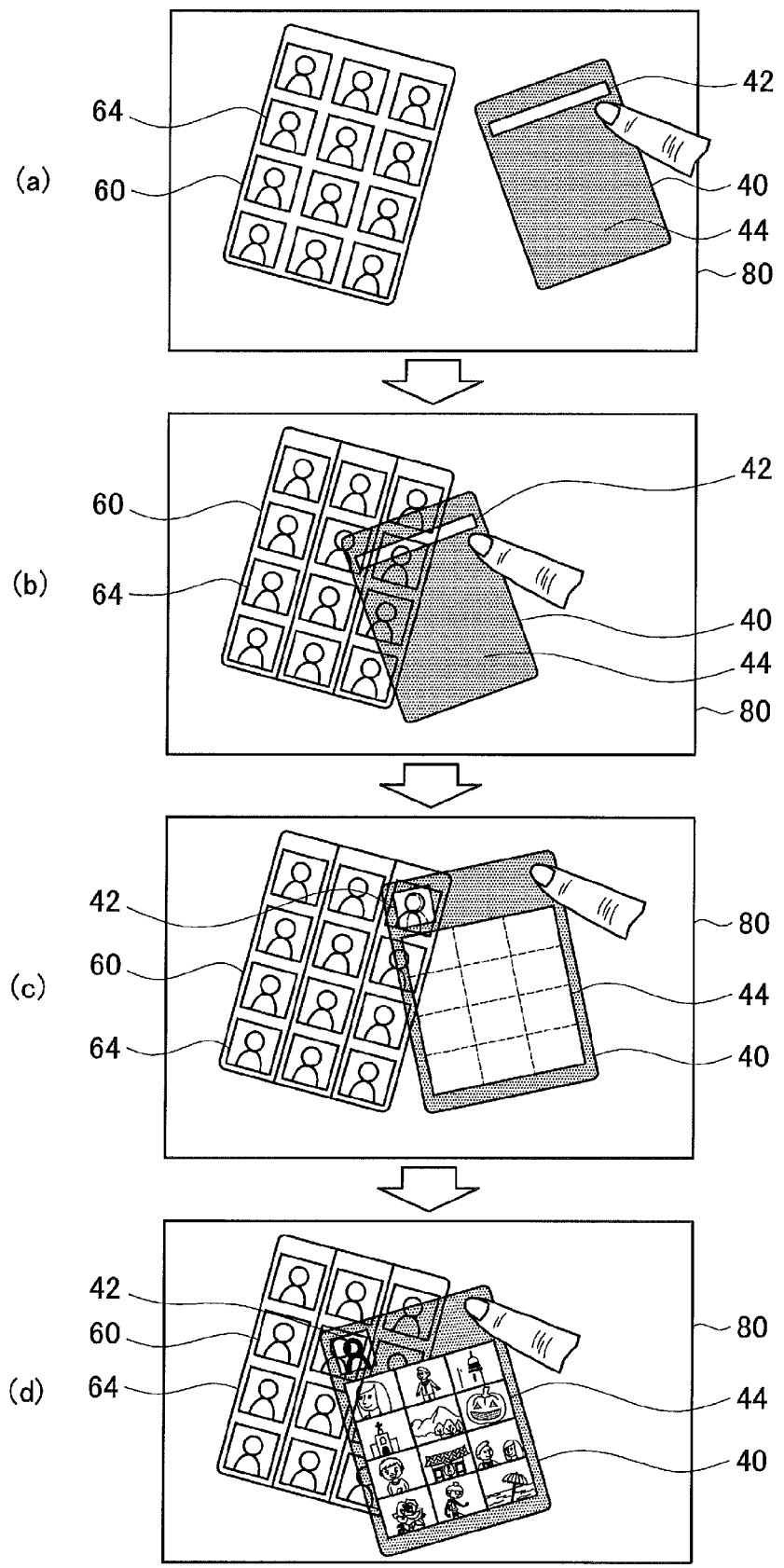
FIG. 9 is an explanatory diagram showing an example of coordination processing of applications according to the embodiment.

An explanation will be given on the coordination processing of applications after the generation of the coordination information and the API described above. Referring to FIG. 9, first, in (a), the display area 60 of the friend list application and the display area 40 of the photograph display application are brought near each other by an operation of a user. Here, since the coordination information of the information output area 64 and the information input area 42 already exists as described above, it is determined that the output information that is associated with the information output area 64 can be input as the input information associated with the information input area 42.

Next, in (b), the information input area 42 and the information output area 64 are overlapped. Then, as in (c), the information input area 42 is modified according to the shape and size of each individual output area included in the information output area 64, for example. Then, as in (d), a name corresponding to the photograph in the information output area 64 overlapping the information input area 42 is input as the input information for the photograph display application. As a result, a thumbnail of the photograph according to the name is displayed in the information output area 44.

[2.2. Example Configuration of Information Processing Apparatus]

Figure 10:
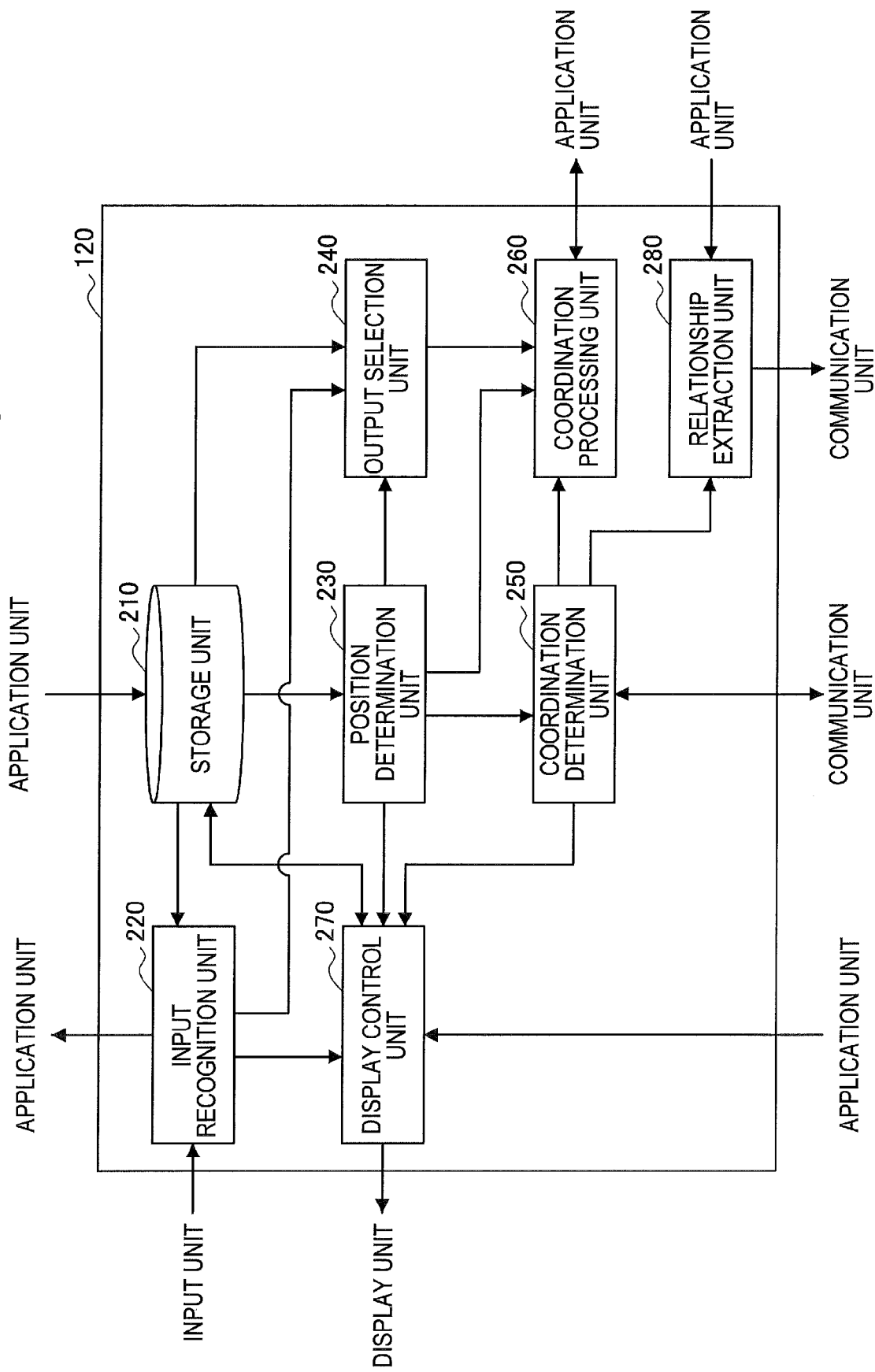
FIG. 10 is a block diagram showing an example of a functional configuration of a control unit according to the embodiment.

The configuration of an information processing apparatus 100 according to the second embodiment is the same as the configuration of the information processing apparatus 100 according to the first embodiment shown in FIG. 5, except for the control unit 120. Accordingly, here, the configuration of the control unit 120 according to the second embodiment will be described using FIG. 10. Referring to FIG. 10, the control unit 120 includes a storage unit 210, an input recognition unit 220, a position determination unit 230, an output selection unit 240, a coordination determination unit 250, a coordination processing unit 260, a display control unit 270, and a relationship extraction unit 280.

Among these, the storage unit 210, the input recognition unit 220, the position determination unit 230, the output selection unit 240, the coordination determination unit 250, the coordination processing unit 260, and the display control unit 270 are as described in [1.2. Example Configuration of Information Processing Apparatus] with reference to FIG. 6. Thus, the relationship extraction unit 280 that is newly added will be described here.

(Relationship Extraction Unit 280)

In the case it is determined that output information is not to be input as input information, the relationship extraction unit 280 extracts an attribute of an output information candidate which may be input as the input information, by comparing an input information sample input as the input information after the determination and one or more output information candidates which may be the output information. Here, the relationship extraction unit 280 acquires from the coordination determination unit 250 a determination result of whether output information can be input as input information. Also, the relationship extraction unit 280 acquires the input information sample from the application unit 130. Then, the relationship extraction unit 280 associates the extracted attribute with the information input area of the input-side application and the information output area of the output-side application, and then transmits the same to a predetermined server existing on a network, for example, via the communication unit 140. Additionally, the extracted attribute may be accumulated in the information processing apparatus 100 instead of the server. In this case, the information processing apparatus 100 may, by itself, generate the coordination information based on the extracted attribute.

By the extraction of an attribute as described above, information necessary for newly defining the coordination processing of applications can be provided. As a result, coordination processing of a larger number of applications may be realized.

[2.3. Example of Flow of Processing]

Figure 11:
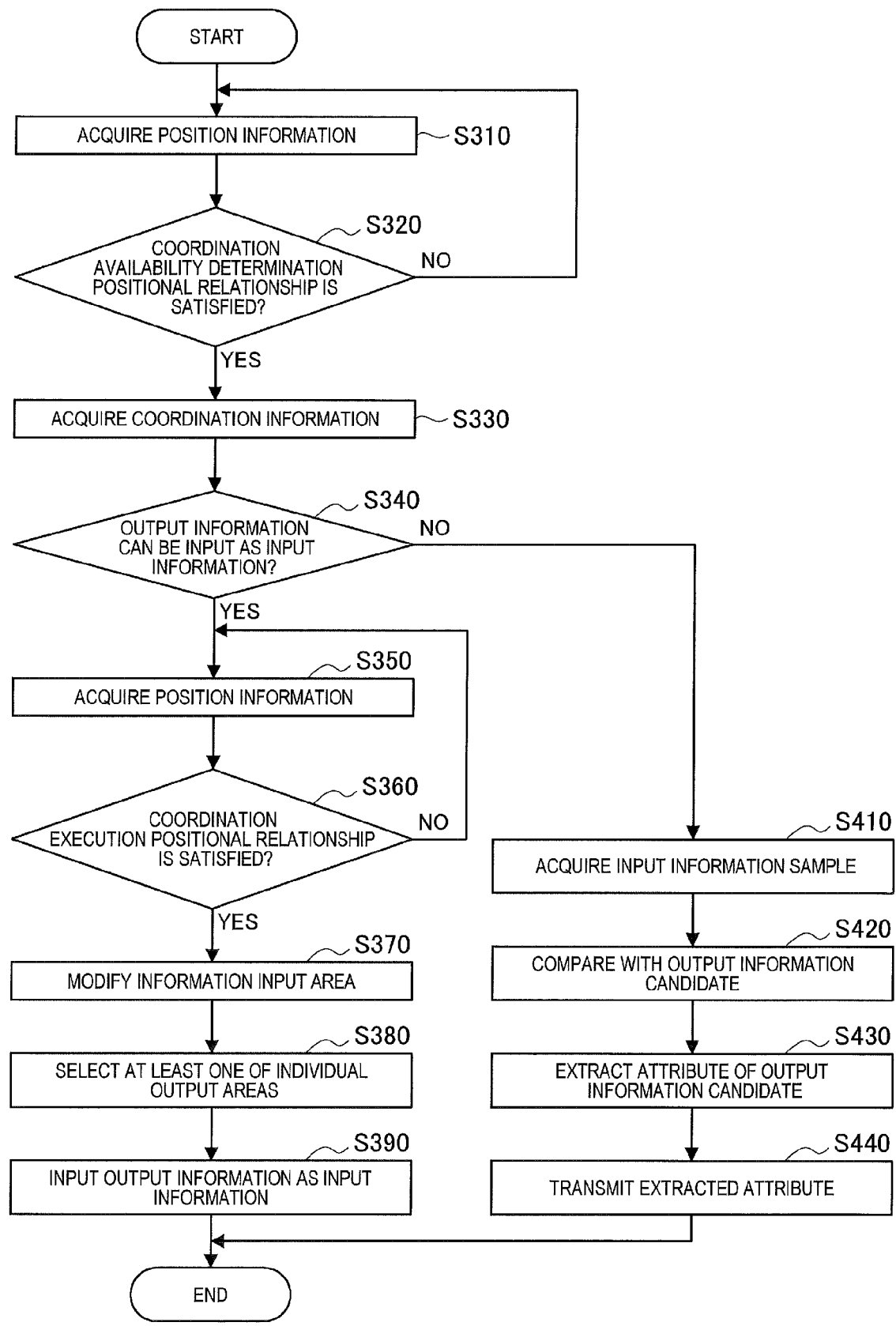
FIG. 11 is a flow chart showing an example of an approximate flow of coordination processing according to the embodiment.

In the following, the coordination processing according to the second embodiment will be described using FIG. 11. FIG.

11 is a flow chart showing an example of an approximate flow of the coordination processing according to the second embodiment. For example, this coordination processing is performed for each pair of the information input area and the information output area.

Steps S310 to S330, and steps S350 to S390 here are the same as those of the coordination processing according to the first embodiment described in [1.3 Example of Flow of Processing]. Accordingly, an explanation will be given here mainly on steps S410 to S440 that are newly added and step S340 which is partially different.

In step S340, the coordination determination unit 250 determines whether output information that is associated with the information output area of the output-side application can be input as input information associated with the information input area of the input-side application. Here, if the input is allowed, the process proceeds to step S350. On the other hand, if the input is not allowed, the process proceeds to step S410.

In step S410, the relationship extraction unit 280 acquires an input information sample from the application unit 130.

Next, in step S420, the relationship extraction unit 280 compares the input information sample acquired and an output information candidate that is associated with the information output area.

Then, in step S430, the relationship extraction unit 280 extracts an attribute of an output information candidate which may be input as the input information.

Then, in step S440, the relationship extraction unit 280 transmits to a predetermined server existing on a network via the communication unit 140, after associating with each other, the attribute extracted, the information input area of the input-side application, and the information output area of the output-side application.

3. Example Hardware Configuration of Information Processing Apparatus

Figure 12:
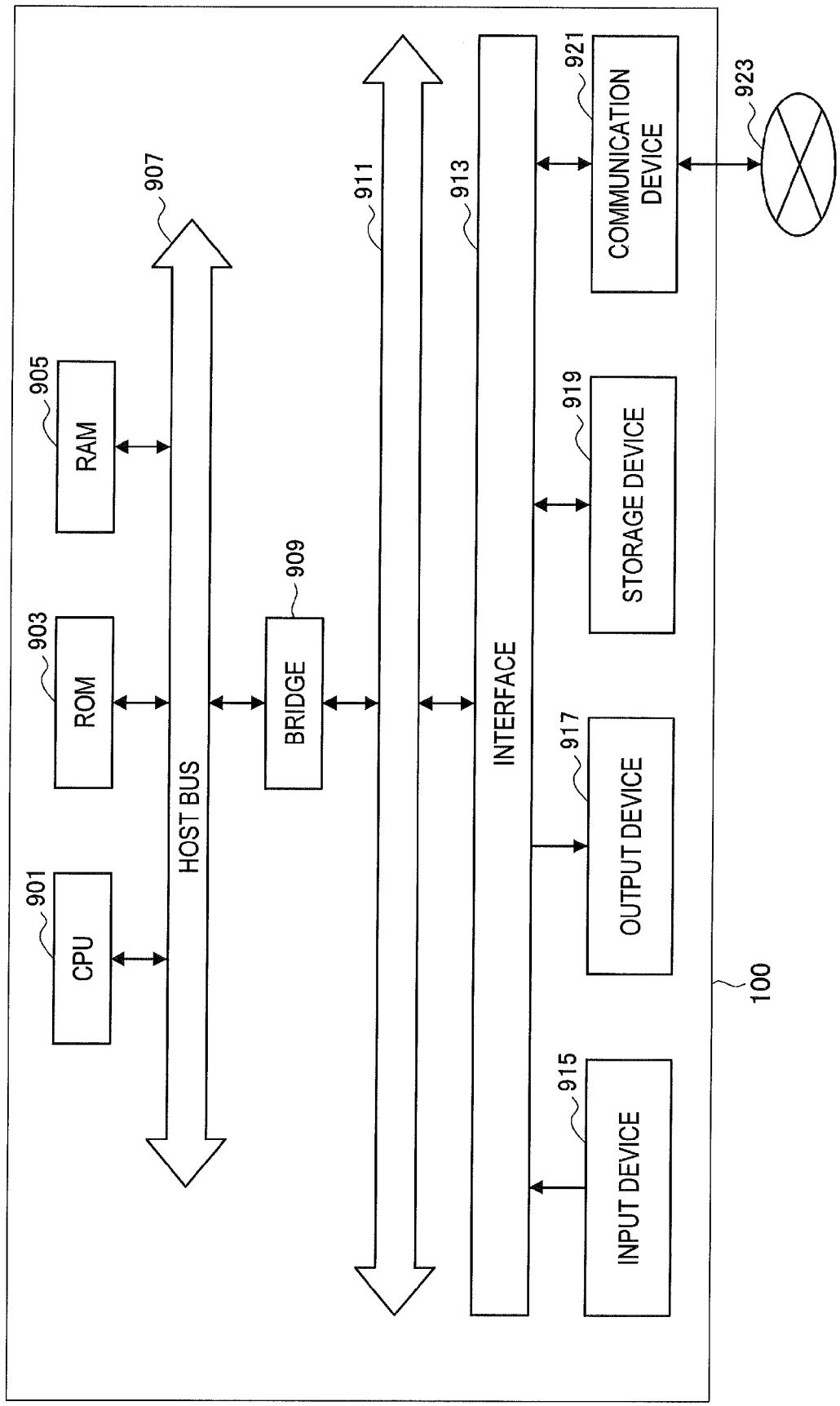
FIG. 12 is a block diagram for describing a hardware configuration of an information processing apparatus according to the present disclosure.

Next, a hardware configuration of the information processing apparatus 100 according to the embodiment of the present disclosure will be described in detail with reference to FIG. 12. FIG. 12 is a block diagram for describing a hardware configuration of the information processing apparatus 100 according to the embodiment of the present disclosure.

The information processing apparatus 100 mainly includes a CPU 901, a ROM 903, and a RAM 905. Also, the information processing apparatus 100 further includes a host bus 907, a bridge 909, an external bus 911, an interface 913, an input device 915, an output device 917, a storage device 919, and a communication device 921.

The CPU 901 functions as an arithmetic processing unit and a control unit, and controls entire operation or a part of operation of the information processing apparatus 100 according to various programs recorded on the ROM 903, the RAM 905, the storage device 919, or a removable recording medium 927. The ROM 903 stores programs to be used by the CPU 901, arithmetic parameters and the like. The RAM 905 temporarily stores programs to be used by the CPU 901, parameters that vary as appropriate in the execution of the programs, and the like. These are connected to each other by the host bus 907 configured from an internal bus such as a CPU bus.

The host bus 907 is connected through the bridge 909 to the external bus 911 such as a PCI (Peripheral Component Interconnect/Interface) bus.

The input device 915 is operation means to be operated by a user, such as a touch panel, a mouse, a keyboard, a button, a switch, a lever or the like. Further, the input device 915 may be remote control means that uses an infrared or another radio wave, or it may be an externally-connected appliance such as a mobile phone, a PDA or the like conforming to the operation of the information processing apparatus 100, for example. Furthermore, the input device 915 is configured from an input control circuit or the like for generating an input signal based on information input by a user with the operation means described above and outputting the signal to the CPU 901. A user of the information processing apparatus 100 can input various kinds of data to the information processing apparatus 100 or instruct the information processing apparatus 100 to perform processing, by operating the input device 915.

The output device 917 is configured from a device that is capable of visually or auditorily notifying a user of acquired information. Such a device may be a display device such as a CRT display device, a liquid crystal display device, a plasma display device, an EL display device or a lamp, an audio output device such as a speaker or a headphone, a printer, a mobile phone, a facsimile and the like. The output device 917 outputs results obtained by various processes performed by the information processing apparatus 100, for example. To be specific, the display device displays, in the form of text or image, results obtained by various processes performed by the information processing apparatus 100. On the other hand, the audio output device converts an audio signal such as reproduced audio data or acoustic data into an analogue signal, and outputs the analogue signal.

The storage device 919 is a device for storing data, configured as an example of a storage unit of the information processing apparatus 100. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various types of data, and acoustic signal data, image signal data and the like acquired from the outside.

The communication device 921 is a communication interface configured from, for example, a communication device for connecting to a communication network 923. The communication device 921 is, for example, a wired or wireless LAN (Local Area Network), a Bluetooth (registered trademark), a communication card for WUSB (Wireless USB), or the like. Also, the communication device 921 may be a router for optical communication, a router for ADSL (Asymmetric Digital Subscriber Line), or a modem for various communications. This communication device 921 can transmit and receive acoustic signals and the like on the Internet and with other communication devices according to a predetermined protocol such as TCP/IP, for example. The communication network 923 connected to the communication device 921 is configured from a network or the like connected via wire or wirelessly, and may be, for example, the Internet, a home LAN, infrared communication, radio wave communication, or satellite communication, for example.

In the foregoing, an example of the hardware configuration capable of realizing the function of the information processing apparatus 100 according to the embodiment of the present disclosure has been described. Each structural element described above may be configured from a general-purpose material or may be configured from hardware dedicated to the function of each structural element. Accordingly, the hardware configuration to be used may be changed as appropriate according to the level of technology at the time of carrying out the embodiment of the present disclosure.

4. Summary

In the foregoing, the first and second embodiments of the present disclosure have been described using FIGS. 1 to 12.

According to the first embodiment, when the information output area of the output-side application and the information input area of the input-side application that move by an operation of a user satisfy the coordination execution positional relationship, the output information that is associated with the information output area is input as input information associated with the information input area. In this manner, the user can use applications in combination simply by performing an intuitive operation of moving the position of the information output area or the information input area.

Furthermore, if one or more output information candidates are associated with the information output area, one of the output information candidates will be taken as the output information. For example, the output information candidate corresponding to the input information will be taken as the output information. A user can thereby input, from the same information output area, information that is in accordance with each input-side application, and not uniform information. Also, for example, at least one of a plurality of individual output areas included in the information output area is selected, and an output information candidate that is associated with the individual output area is taken as the output information. The user is thereby enabled to input desired output information to the input-side application by selecting at least one of the individual output areas.

Furthermore, depending on the application, the information input area is modified after the coordination execution positional relationship is satisfied. The user can thereby recognize that coordination of the applications is allowed, and also that an individual output area has to be further selected.

Furthermore, according to the second embodiment, in the case it is determined that the output information is not to be input as the input information, an input information sample actually input and an output information candidate which may be the output information are compared, and an attribute of an output information candidate which may be input as the input information is extracted. Such extraction of an attribute enables provision of information necessary to newly define the coordination processing of applications, and as a result, coordination processing of a larger number of applications may be realized.

It should be understood by those skilled in the art that various modifications, combinations, sub-combinations and alterations may occur depending on design requirements and other factors insofar as they are within the scope of the appended claims or the equivalents thereof.

Additionally, the following configurations are also within the scope of the present disclosure.

(1) An information processing apparatus including:
a position determination unit for determining whether or not a position of an information input area included in a display area of a first application and a position of an information output area included in a display area of a second application satisfy a predetermined first positional relationship; and
a coordination processing unit for inputting, in a case it is determined that the predetermined first positional relationship is satisfied, output information of the second application that is associated with the information output area to the first application as input information associated with the information input area.

(2) The information processing apparatus according to (1), wherein the coordination processing unit takes at least one of one or more output information candidates associated with the information output area as the output information.

(3) The information processing apparatus according to (2), wherein the coordination processing unit takes the output information candidate corresponding to the input information as the output information.

(4) The information processing apparatus according to (2), further including:
an output selection unit for selecting, in a case the information output area includes a plurality of individual output areas, at least one of the individual output areas,
wherein, in a case an individual output area is selected, the coordination processing unit takes the output information candidate that is associated with the individual output area as the output information.

(5) The information processing apparatus according to (4), wherein the output selection unit selects at least one of the individual output areas based on the position of the information input area and a position of each of the plurality of individual output areas.

(6) The information processing apparatus according to (4), further including:
an input recognition unit for recognizing, based on operation information acquired from an input operation, area specifying information specifying at least one of the individual output areas,
wherein the output selection unit selects the individual output area specified by the area specifying information.

(7) The information processing apparatus according to any one of (1) to (6), wherein the predetermined first positional relationship is a positional relationship where the information input area and the information output area are at least partially overlapped.

(8) The information processing apparatus according to any one of (1) to (7), further including:
a coordination determination unit for determining whether or not the output information can be input as the input information.

(9) The information processing apparatus according to (8), wherein the position determination unit further determines whether or not the position of the information input area and the position of the information output area satisfy a predetermined second positional relationship, and
wherein, in a case it is determined that the predetermined second positional relationship is satisfied, the coordination determination unit determines whether or not the output information can be input as the input information.

(10) The information processing apparatus according to (9), wherein the predetermined second positional relationship is a positional relationship where a distance between the information input area and the information output area is a predetermined distance or less.

The information processing apparatus according to any one of (8) to (10), further including:
a display control unit for causing to be displayed on a display screen, in a case it is determined that the output information can be input as the input information, an indicator indicating that input from the second application to the first application is allowed, and for causing to be displayed on the display screen, in a case it is determined that the output information is not to be input as the input information, an indicator indicating that the input is not allowed.

(12) The information processing apparatus according to any one of (1) to (11), further including:
a display control unit for modifying the information input area in a case it is determined that the predetermined first positional relationship is satisfied.

(13) The information processing apparatus according to (12), wherein the display control unit modifies the information input area according to at least one of a shape, a size, and a tilt of the information output area.

(14) The information processing apparatus according to (12) or (13), wherein the display control unit modifies the information input area by changing at least one of a shape, a size, and a tilt of the information input area.

(15) The information processing apparatus according to any one of (8) to (14), further including:
a relationship extraction unit for comparing, in a case it is determined that the output information is not to be input as the input information, an input information sample input as the input information after the determination and one or more output information candidates which may be the output information, and thereby extracting an attribute of an output information candidate which may be input as the input information.

(16) A program for causing a computer for controlling an information processing apparatus to function as:
a position determination unit for determining whether or not a position of an information input area included in a display area of a first application and a position of an information output area included in a display area of a second application satisfy a predetermined first positional relationship; and
a coordination processing unit for inputting, in a case it is determined that the predetermined first positional relationship is satisfied, output information of the second application that is associated with the information output area to the first application as input information associated with the information input area.

(17) A coordination processing method including:
determining whether or not a position of an information input area included in a display area of a first application and a position of an information output area included in a display area of a second application satisfy a predetermined first positional relationship; and
inputting, in a case it is determined that the predetermined first positional relationship is satisfied, output information of the second application that is associated with the information output area to the first application as input information associated with the information input area.

What is claimed is:

1. An information processing apparatus comprising:
a position determination unit for determining whether or not a position of an information input area included in a display area of a first application and a position of an information output area included in a display area of a second application satisfy a predetermined first positional relationship;
and a coordination processing unit for inputting, when a determination result indicates that the predetermined first positional relationship is satisfied, output information of the second application that is associated with the information output area of the display area of the second application to the first application as input information associated with the information input area,
in which the display area of the first application has the information input area and an information output area and a display area of the second application has an information input area and the information output area, and
in which the predetermined first positional relationship is a positional relationship where the information input area of the display area of the first application partially overlaps with the information output area of the display area of the second application, such that the position determination unit is configured to determine whether or not the information input area included in the display area of the first application partially overlaps with the information output area included in the display area of the second application to determine the determination result; and
a coordination determination unit for determining whether or not the output information can be input as the input information; and
a relationship extraction unit for comparing, in a case it is determined that the output information is not to be input as the input information, an input information sample input as the input information after the determination and one or more output information candidates which may be the output information, and thereby extracting an attribute of an output information candidate which may be input as the input information,
wherein the attribute extracted from the information output area of the display area of the second application and the information input area of the display area of the first application are associated with each other and accumulated as learning information, so that it is learnt based on the learning information accumulated that an information output area which has the extracted attribute is to be input to an associated information input area.

2. The information processing apparatus according to claim 1, wherein the coordination processing unit takes at least one of one or more output information candidates associated with the information output area of the second application as the output information.

3. The information processing apparatus according to claim 2, further comprising:
an output selection unit for selecting, in case the information output area of the second application includes a plurality of individual output areas, at least one of the individual output areas,
wherein, in case an individual output area is selected, the coordination processing unit takes the output information candidate that is associated with the individual output area as the output information.

4. The information processing apparatus according to claim 3, wherein the output selection unit selects at least one of the individual output areas based on the position of the information input area of the first application and a position of each of the plurality of individual output areas.

5. The information processing apparatus according to claim 3, further comprising:
an input recognition unit for recognizing, based on operation information acquired from an input operation, area specifying information specifying at least one of the individual output areas,
wherein the output selection unit selects the individual output area specified by the area specifying information.

6. The information processing apparatus according to claim 1, wherein the position determination unit further determines whether or not the position of the information input area of the first application and the position of the information output area of the second application satisfy a predetermined second positional relationship, and wherein, in case it is determined that the predetermined second positional relationship is satisfied, the coordination determination unit determines whether or not the output information can be input as the input information.

7. The information processing apparatus according to claim 6, wherein the predetermined second positional relationship is a positional relationship where a distance between the information input area of the first application and the information output area of the second application is a predetermined distance or less.

8. The information processing apparatus according to claim 6, further comprising:
a display control unit for causing to be displayed on a display screen, in case it is determined that the output information can be input as the input information, an indicator indicating that input from the second application to the first application is allowed, and for causing to be displayed on the display screen, in case it is determined that the output information is not to be input as the input information, an indicator indicating that the input is not allowed.

9. The information processing apparatus according to claim 1, further comprising:
a display control unit for modifying the information input area of the first application in case it is determined that the predetermined first positional relationship is satisfied.

10. The information processing apparatus according to claim 9, wherein the display control unit modifies the information input area of the first application according to at least one of a shape, a size, and a tilt of the information output area.

11. The information processing apparatus according to claim 9, wherein the display control unit modifies the information input area of the first application by changing at least one of a shape, a size, and a tilt of the information input area.

12. A program stored on a non-transitory computer-readable recording medium for controlling an information processing apparatus to function as:
a position determination unit for determining whether or not a position of an information input area included in a display area of a first application and a position of an information output area included in a display area of a second application satisfy a predetermined first positional relationship;
and a coordination processing unit for inputting, when a determination result indicates that the predetermined first positional relationship is satisfied, output information of the second application that is associated with the information output area of the display area of the second application to the first application as input information associated with the information input area,
in which the display area of the first application has the information input area and an information output area and a display area of the second application has an information input area and the information output area, and
in which the predetermined first positional relationship is a positional relationship where the information input area of the display area of the first application partially overlaps with the information output area of the display area of the second application, such that the position determination unit is configured to determine whether or not the information input area included in the display area of the first application partially overlaps with the information output area included in the display area of the second application to determine the determination result; and
a coordination determination unit for determining whether or not the output information can be input as the input information; and
a relationship extraction unit for comparing, in a case it is determined that the output information is not to be input as the input information, an input information sample input as the input information after the determination and one or more output information candidates which may be the output information, and thereby extracting an attribute of an output information candidate which may be input as the input information,
wherein the attribute extracted from the information output area of the display area of the second application and the information input area of the display area of the first application are associated with each other and accumulated as learning information, so that it is learnt based on the learning information accumulated that an information output area which has the extracted attribute is to be input to an associated information input area.

13. A coordination processing method comprising: determining, by a control device, whether or not a position of an information input area included in a display area of a first application and a position of an information output area included in a display area of a second application satisfy a predetermined first positional relationship; and
inputting, when a determination result indicates that the predetermined first positional relationship is satisfied, output information of the second application that is associated with the information output area to the first application as input information associated with the information input area,
in which the display area of the first application has the information input area and an information output area and a display area of the second application has an information input area and the information output area, and
in which the predetermined first positional relationship is a positional relationship where the information input area of the display area of the first application partially overlaps with the information output area of the display area of the second application, such that the position determination unit is configured to determine whether or not the information input area included in the display area of the first application partially overlaps with the information output area included in the display area of the second application to determine the determination result; and
determining whether or not the output information can be input as the input information; and
comparing, in a case it is determined that the output information is not to be input as the input information, an input information sample input as the input information after the determination and one or more output information candidates which may be the output information, and thereby extracting an attribute of an output information candidate which may be input as the input information,
wherein the attribute extracted from the information output area of the display area of the second application and the information input area of the display area of the first application are associated with each other and accumulated as learning information, so that it is learnt based on the learning information accumulated that an information output area which has the extracted attribute is to be input to an associated information input area.

* * * * *